(12) United States Patent
Leidich et al.

(10) Patent No.: US 12,116,101 B2
(45) Date of Patent: *Oct. 15, 2024

(54) LAUNCH SYSTEM FOR LIGHTER-THAN-AIR-BALLOONS

(71) Applicant: URBAN SKY

(72) Inventors: Jared Leidich, Denver, CO (US); Mitchell W. Sweeney, Alvin, TX (US); Nolan G. Smith, Denver, CO (US); Maxmillion J. W. McLaughlin, Fort Myers, FL (US); Andrew F. Antonio, Denver, CO (US)

(73) Assignee: URBAN SKY THEORY INC., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/312,405

(22) Filed: May 4, 2023

(65) Prior Publication Data

US 2023/0271690 A1    Aug. 31, 2023

Related U.S. Application Data

(63) Continuation of application No. 17/563,954, filed on Dec. 28, 2021, now Pat. No. 11,679,854.

(60) Provisional application No. 63/131,076, filed on Dec. 28, 2020.

(51) Int. Cl.
*B64B 1/00* (2006.01)
*B64B 1/50* (2006.01)

(52) U.S. Cl.
CPC ............... *B64B 1/005* (2013.01); *B64B 1/50* (2013.01)

(58) Field of Classification Search
CPC .. B64B 1/00; B64B 1/005; B64B 1/02; B64B 1/50; B64B 1/58; B64B 1/64
See application file for complete search history.

(56) References Cited

U.S. PATENT DOCUMENTS

| | | | |
|---|---|---|---|
| 2,919,083 A * | 12/1959 | Suomi | B64B 1/58 244/31 |
| 3,055,616 A | 9/1962 | Sandlin | |
| 4,421,286 A * | 12/1983 | Laky | B64F 1/14 244/116 |
| 6,234,425 B1 * | 5/2001 | Rand | B64D 1/12 244/137.4 |
| 6,402,090 B1 | 6/2002 | Aaron | |
| 2014/0077030 A1 | 3/2014 | Cunningham et al. | |
| 2015/0284065 A1 * | 10/2015 | MacCallum | B64D 17/62 244/30 |
| 2020/0262558 A1 | 8/2020 | De France et al. | |

FOREIGN PATENT DOCUMENTS

CN           108163179 A        6/2018

* cited by examiner

*Primary Examiner* — Philip J Bonzell
*Assistant Examiner* — Anna L. Gordon
(74) *Attorney, Agent, or Firm* — HOLZER PATEL DRENNAN (57) ABSTRACT

An example method for launching a high-altitude balloon includes securing a launch collar around a balloon envelope to form a choke point separating an upper portion of the balloon envelope from a lower portion of the balloon envelope. The balloon envelope is structurally secured to a launch platform via a tether that is coupled to the launch collar. The launch collar is configured such that release of the launch collar from the choke point releases the balloon envelope from the launch platform.

20 Claims, 9 Drawing Sheets

LAUNCH SYSTEM FOR LIGHTER-THAN-AIR-BALLOONS

CROSS REFERENCE TO RELATED APPLICATIONS

The present application claims priority to U.S. Provisional Patent Application No. 63/131,076, titled "Mobile Launch System and Methods for Lighter-than-Air-Balloons", and filed on Dec. 28, 2020, and also to U.S. patent application Ser. No. 17/563,954, issued as U.S. Patent No. 11,679,854, titled "Mobile Launch System and Methods for Lighter-than-Air-Balloons" and filed on Dec. 28, 2021. Both of these applications are hereby incorporated by reference for all that they disclose or teach.

BACKGROUND

High-altitude balloons can be a useful tool in a variety of applications such as Earth observation, atmospheric sampling, celestial imaging, and communications repeating. Since high-altitude balloons are steered by wind, launch sites are often selected dynamically near the time of launch based on weather (wind direction and wind speed) as well as based on the geographical area(s) of interest for a particular flyover.

The term "lighter than air balloon" refers to balloons filled with a lift gas with a lower density than normal atmospheric gases so that the balloon rises as a result. Lighter-than-air balloons are typically very large (e.g., several meters in length) and extremely lightweight. Consequently, these balloons can be heavily affected by wind during the launch process.

Amplifying this problem is the fact that lighter-than-air balloons are typically not completely filled at the time of launch. In these systems, the lift gas expands as the balloon rises, effectively filling the balloon envelope with increasing altitude. At the time of launch, lighter-than-air balloons may be ~10% full of lift gas and not completely full until reaching a target altitude (e.g., 60,000 feet). When wind acts on a balloon envelope, the balloon fabric can take on the form of a spinnaker sailboat sail or a parachute that is vulnerable to displacement and damage by large forces created by wind. Large lateral forces during a launch process can also create excessive lean in a lighter-than-air balloon system. Excessive lean may cause the balloon system to swing like a pendulum during launch, risking a collision between a payload and the ground.

In hot air balloon systems, it is common to anchor the balloon to the ground using an extendable line during launch so that the balloon can be let out into the sky for some distance where the payload (e.g., passenger-carrying basket) is a substantial height off the ground and unlikely to swing and hit the ground when the balloon is released. With lighter-than-air balloons, however, this is not common because these types of systems are so vulnerable to wind. Even a light wind may cause an inflated part of the balloon to lean over excessively. In many cases, this lean is dramatic enough to exceed the force of free lift—meaning, the balloon is unable to rise regardless of how much line is let out.

Because wind presents such extreme challenges in launching high-altitude balloons, existing solutions typically restrict launch to days with low winds.

SUMMARY

According to one implementation, a method for launching a high-altitude balloon includes securing a launch collar around a balloon envelope to form a choke point separating an upper portion of the balloon envelope from a lower portion of the balloon envelope. The balloon envelope is structurally secured to a launch platform via a tether that is coupled to the launch collar. The launch collar is configured such that release of the launch collar from the choke point releases the balloon envelope from the launch platform.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

A mobile launch system disclosed herein includes features that enable launch of a lighter-than-air balloon in high winds. Due to mobility of the launch system, the launch can occur from any location—even locations difficult to access or that would traditionally be unavailable due to characteristically unfavorable weather (wind). This ensures that launch can occur from a precise location on the ground that is selected to ensure the balloon's trajectory flies over a preselected point on the ground.

According to one implementation, a mobile launch system includes a unique launch collar that also acts as an anchor for the balloon envelope while the balloon envelope is being filled with a lift gas. The launch collar forms a choke point around the balloon envelope, dividing upper and lower portions of the balloon envelope from one another. The launch collar is structurally secured to an earth-based anchor-point while the upper portion of the balloon is being filled with a lift gas. Structurally securing the balloon further "up" the balloon envelope in this manner effectively reduces total system "lean" for any given wind. That is due, in part, to the fact that the length of fabric that is torqued by wind is shortened, which changes the center of pressure from lateral wind force. The reduction in lean is also partially attributable to a change in the center of lift for the system that is caused by injecting lift gas into the balloon through a fill port that is positioned above the launch collar—a location that is higher up on the balloon envelope than in traditional systems.

Reducing the effective lean of the balloon system in high winds reduces the likelihood that the balloon will swing like a pendulum upon release and potentially crash the payload into the ground. Additionally, the reduction of this lean facilitates launch of the balloon system in very high winds that would—in other systems—prevent launch by causing the balloon fabric to fan out like a sail and create a large torque that counteracts the lift force.

In the above-described implementation, balloon envelope fabric below the launch collar (e.g., below the choke point) is permitted to pivot about the earth-based anchor point and may be blown upwards by lateral winds. The upward force counters the downward force created by pivoting of the upper portion of the balloon envelope above the pivot point, further stabilizing the balloon and reducing wobble when the balloon is released.

According to yet another implementation, a launch method disclosed herein provides for controlled release of a balloon system by decoupling a tether from an attachment point on a launch collar that is wrapped around the balloon envelope to form a choke point. When released, the balloon contains lift gas in an upper portion above the choke point. The lift force of the balloon causes the tether to decouple from the launch collar, and the mechanics of the launch collar are such that it is not possible for the balloon to rise away from earth with the launch collar still attached. This ensures the balloon will not explode due to expanding lift gas trapped in the balloon envelope above a choke point created by the launch collar.

In still another implementation, the launch collar is wrapped around the balloon envelope and secured to a top of a mast on a ground-based platform while the upper portion of the balloon above the launch collar is injected with lift gas. The distance between the top of the mast and the ground may exceed a distance between the launch collar and a payload attached to the balloon envelope, ensuring that the payload cannot collide with the ground even under extreme winds.

These and other advantages are explored in detail below with respect to the following figures.

Figure 1:
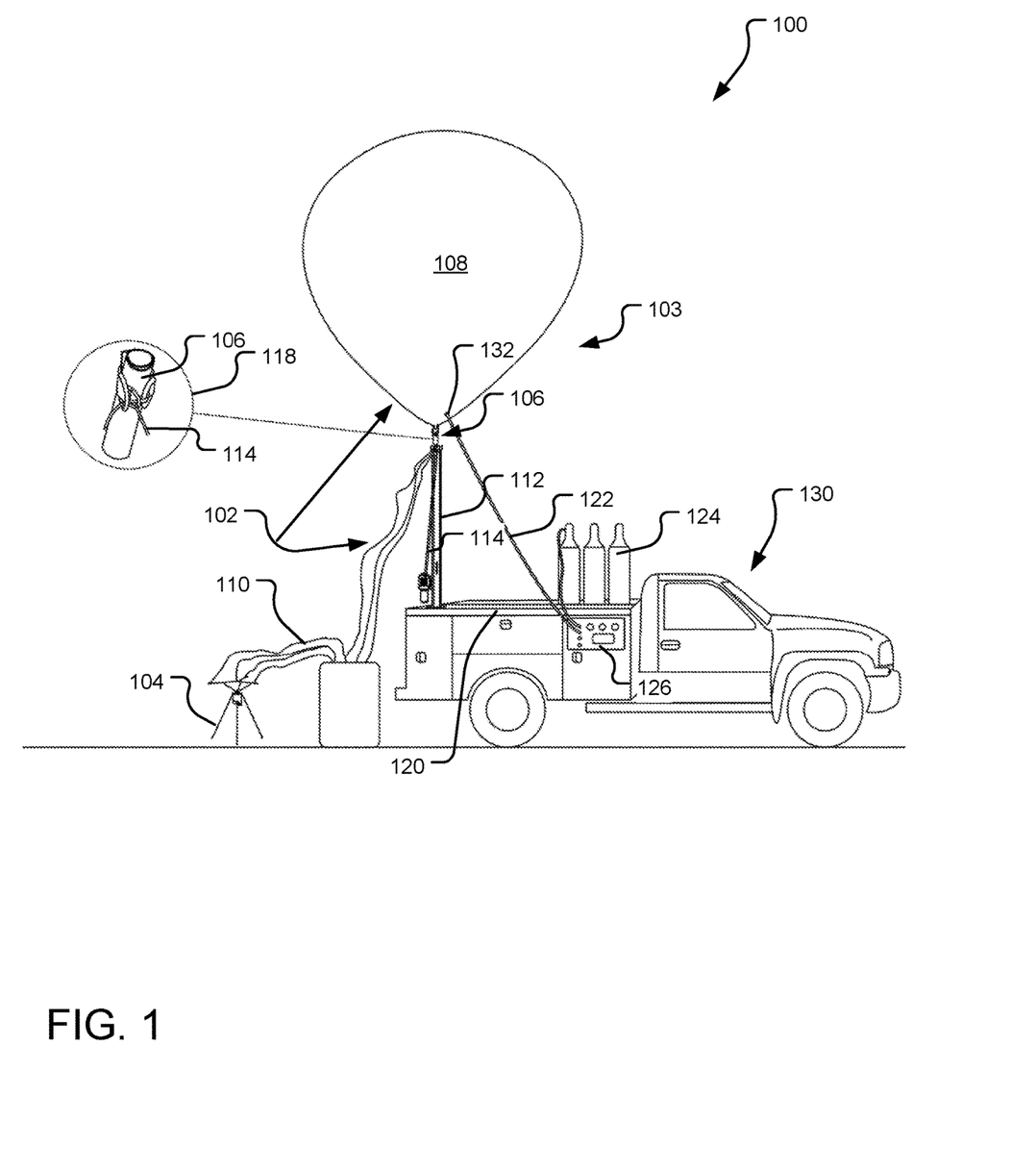
FIG. 1 illustrates an example system for launching a high altitude balloon.

FIG. 1 illustrates a system 100 for launching a high-altitude balloon 103 in high winds. The high-altitude balloon 103 may, in different implementations, include a variety of different features but is in at least one implementation a lighter-than-air balloon. The high-altitude balloon 103 includes a payload 104 and a balloon envelope that includes an upper portion 108 and a lower portion 110. Launch of the high-altitude balloon 103 is assisted by a launch collar 106, shown wrapped around a central portion of the balloon envelope 102 to form a choke point in the fabric of the balloon envelope 102. The choke point formed by the launch collar 106 separates the upper portion 108 from the lower portion 110 of the balloon envelope 102. In FIG. 1, the balloon envelope 102 is shown with a lift gas in it just before a controlled launch sequence. The lower portion 110 of the balloon envelope 102 is unfilled and appears as a long tail of fabric that hangs from the choke point formed by the launch collar 106.

Although not shown in detail in FIG. 1, the high-altitude balloon 103 is structurally secured by the launch collar 106 to a tether 114 that is further affixed to a mast 112 on a ground-based platform 120. As used herein, "ground-based platform" is used to imply a platform that is on the ground or on a vehicle on the ground. In FIG. 1, the ground-based platform 120 is shown to be part of an automobile (e.g., a truck 130). This is advantageous, as it may allow for launch of the high-attitude balloon 103 from a variety of select and/or hard-to reach locations to facilitate precise placement of the balloon system along a pre-selected flight path. In other implementations, the ground-based platform 120 is a semi-permanent or permanent (non-mobile) platform. For example, the ground-based platform may be a stage built upon or including the underlying ground.

The tether 114 is coupled to one or more attachment points on the launch collar 106. Exemplary features of the launch collar 106 are shown in magnified view 118 and discussed further with respect to other features shown herein. In one implementation, the launch collar 106 includes a piece of fabric that is rolled around the balloon envelope and that is secured by a strap including one or more coupling mechanisms (rings) at either end. The tether 114 engages with the launch collar 106 and tensions the launch collar 106 against the underlying fabric.

In one implementation, the tether 114 is threaded through the coupling mechanism on the launch collar 106 and has first and second ends that are distal from the collar and secured, prior to launch, at respective attachment points on or near the ground-based platform 120. During launch, one of the ends of the tether 114 is released. This end is referred to herein as the "release end" while the other opposite end of the tether is referred to as the "anchor end." The anchor end is, in one implementation, securely anchored to the mast 112. The release end of the tether 114 opposite the anchor end is, prior to launch, also secured to the mast 112 or to another ground-based attachment point. As used herein, the term ground-based attachment point refers to any point that is substantially fixed relative to Earth and/or to the ground-based platform 120. For example, a ground-Holzer based attachment point may be a point on the ground-based platform 120, the ground external to the ground-based platform 120, or even in the hands of a person (e.g., an operator) standing on or near the ground-based platform 120.

While the high altitude balloon 103 is secured to the ground-based platform 120, the upper portion 108 of the balloon envelope 102 contains a lift gas, such as helium, hydrogen, or any other lift gas. Notably, a fill port 132 is located in the upper portion 108 just above the launch collar 106. Tubing 122 facilitates the flow of gas from tank(s) 124 on the ground-based platform 120 into the upper portion 108 of the balloon envelope 102. The flow of lift gas may be controllably metered by an operator interacting with controls on a control panel 126 or other suitable automatic or manual control means.

According to one implementation, the high altitude balloon 103 is released and allowed to rise (launch) when the upper portion 108 of the balloon envelope contains a lift gas. For example, the upper portion 108 of the balloon envelope 102 may be just 10% filled with lift gas at the point in time when a controlled release is initiated. The lift gas expands as it rises; thus, the balloon envelope 102 continues to gradually self-fill as the high-altitude balloon 103 rises to altitude.

Although launch collars are used in some existing balloon systems to help control the balloon envelope while it is being filled, these traditional launch collars function differently in both design and purpose from those disclosed herein. In these existing systems, a line between the launch collar and launch platform does not serve as a primary structural securement line that is paid out (controllably released to allow the balloon to rise) during launch. Rather, the collar is typically released by a manual act just after release of a main structural securement line. In these systems, malfunction of the launch collar (e.g., failed release) can lead to scenarios where the balloon launches while the launch collar is still attached. Due to the expanding lift gas and fixed size of the balloon envelope above the launch collar, the balloon inevitably explodes at some point during ascension.

In the disclosed system, however, it is the release of the launch collar 106 that facilitates the controlled release of the high-altitude balloon 103. That is, the balloon cannot be freed of its anchor to the ground-based platform 120 unless and until the launch collar 106 is released. Mechanisms for controlled release of the launch collar 106 are discussed with respect to other features herein.

Figure 2:
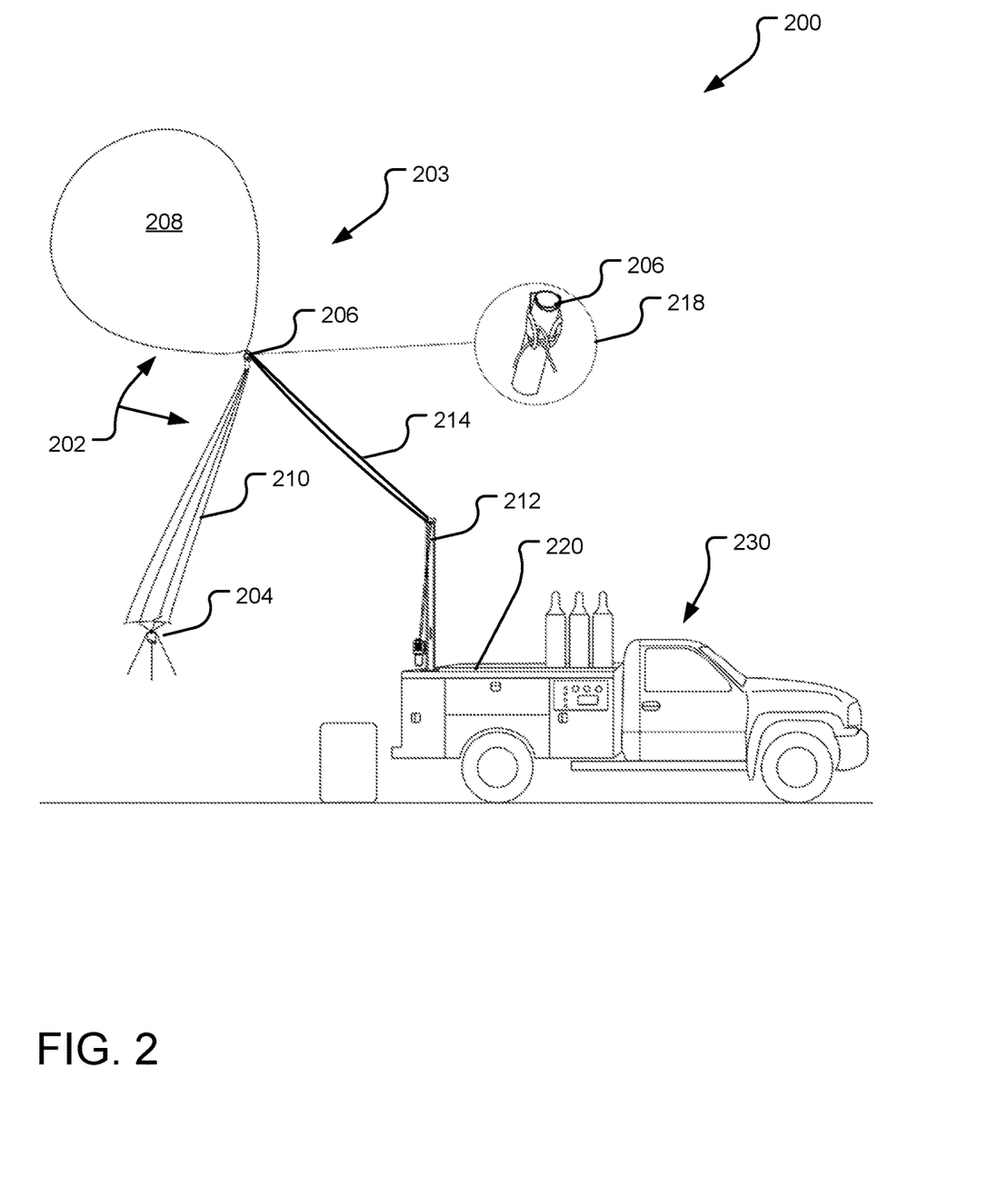
FIG. 2 illustrates a launch system configured for early operations of a launch sequence.

FIG. 2 illustrates a launch system 200 configured for early operations of a launch sequence. The system of FIG. 2 includes many of the features of FIG. 1 including the high-altitude balloon 203 and launch platform 220 which is, by example and without limitation, shown integrated into the back of a vehicle 230. The launch platform 220 includes a mast 212 that serves as an anchor point for a tether 214 attached to a launch collar 216 that is wrapped around a central portion of a balloon envelope 202 to form a choke point separating an upper portion 208 of the balloon envelope 202 from a lower portion of the balloon envelope 102.

In one implementation, the tether 214 has two opposite ends that are both secured to attachment points on the launch platform 220 or other ground-based attachment points prior to launch. A first end (the anchor end) of the tether 214 is fixedly secured to a mast 212 while a second end (the release end) is temporarily secured to the mast 212 or other ground-based attachment point. For example, the release end of the tether 214 may include a spool of additional line that is secured prior to launch and the controllably released (paid out) by an operator or automated mechanism during launch of the high altitude balloon 203. A central portion of the tether 214 is coupled to the launch collar 206. As shown in greater detail in magnified view 218, the tether 214 may be threaded through one or more apertures (e.g., rings) on the launch collar 206.

In FIG. 2, the upper portion of the balloon envelope 208 contains a lift gas as discussed above with respect to FIG. 1. The lift gas creates a lift force that pulls upward on the tether 214. During a controlled launch operation, additional line of the tether 214 is slowly paid out (e.g., from a spool) while the opposite end of the tether remains anchored to the mast 212. The lift force on the balloon envelope 202 against the newly-released line causes the coupling mechanisms (e.g., rings) on the launch collar 206 to pull away from the anchored end of the tether 214 and slide along the tether 214 such that the lift force slowly lifts the launch collar 206 away from the mast 212.

In a launch operation illustrated in FIG. 2, some of the release line has been paid out (e.g., gradually released from a spool or other attachment point) to allow the upper portion 208 of the balloon envelope 202 to rise a short distance above the launch platform 220. Due to this, the effective length of the tether 214 between the launch collar 206 and mast 212 is longer in FIG. 2 than in FIG. 1. In this view, it is easier to see that the high-altitude balloon 103 is structurally secured by the launch collar 206 up until the moment of launch. In one implementation, the high-altitude balloon 103 is structurally secured by the launch collar 206 (as shown) and not secured by any other line or attachment mechanism during the launch operations up until the balloon is released.

According to one implementation, the launch collar 206 includes a ring-lock mechanism that remains in a locked state against the fabric of the balloon envelope 202 as long is the rings (e.g., rings shown in magnified view 218) remain under tension with the tether 214 threaded through the rings.

When the upper potion 208 of the balloon envelope 202 has risen a safe distance from the launch platform 220 (e.g., far enough to mitigate risk of a payload 204 colliding with the ground upon release), an operator or automated process may completely let go of the release end of the tether 214. The lift force acting on the balloon envelope 202 pulls the launch collar 206 upward, causing the rings to slide relative to the tether 214 while the anchored end of the tether 214 remains fixed to the launch platform 220. Eventually, the released end of the tether 214 slides out of the launch collar 206, which in turn causes the launch collar 206 to open and fall away from the balloon envelope 202, freeing the high-altitude balloon 203 to rise into the atmosphere. Thus, it is the separation of the tether 214 from the launch collar 206 that structurally releases the high-altitude balloon 203 from the launch platform 220. As explained above, this configuration prevents scenarios where the high-altitude balloon system 203 is inadvertently released with the launch collar 206 still attached, leading to explosion of the balloon envelope 202 and a potentially dangerous crash of the payload 204 back to earth.

In addition to protecting the balloon from explosions in scenarios where the launch collar does not release during launch, structurally securing the balloon further "up" the balloon envelope 202 as shown (e.g., at the illustrated location of the launch collar 206 rather than at the bottom near the payload 204) effectively reduces total lean of the balloon envelope 202 for any given wind. In systems that structurally secure balloons at or near the payload 204, there exists a much longer length of fabric that is vulnerable to being torqued by wind than in the illustrated system 200 due to the fact that the full length of the balloon envelope is permitted to pivot along a single torque axis relative to structural securement (pivot) point. Locating the structural securement (pivot) point higher up on the balloon envelope 202, such as at the illustrated location of the launch collar 206, reduces the length of fabric relative to the corresponding pivot point in the presence of wind, which in turn reduces the magnitude of the torque acting on the fabric. Instead of one long torque pulling the balloon envelope, there are effectively two separate smaller torques that act in different directions relative to the pivot point at the launch collar 206. This reduces total lean of the high-altitude balloon system 203 during launch when winds are present.

Additionally, since the illustrated configuration permits wind to blow the lower portion 210 of the balloon envelope 202 upwards toward the launch collar 206, an upward force is created to counter the downward force created by pivoting of the upper portion 208 of the balloon envelope 202 above the launch collar 206. This further stabilizes the balloon and reduces wobble when the balloon is released, which reduces the likelihood of the payload 204 striking the ground in the moments leading up to lift-off.

In different implementations, the launch collar 206 may be attached at different points along the length of the balloon envelope 202. In one implementation, the launch collar 206 is attached to the balloon envelope at a location relative to a top end of the balloon envelope corresponding to about $\frac{1}{3}$ of the total fabric length top-to-bottom. In other implementations, the launch collar 206 may be attached closer to a midpoint of the balloon envelope.

Features of FIG. 2 not specifically described above may be assumed to be the same or similar to like-named components discussed elsewhere herein.

Figure 3:
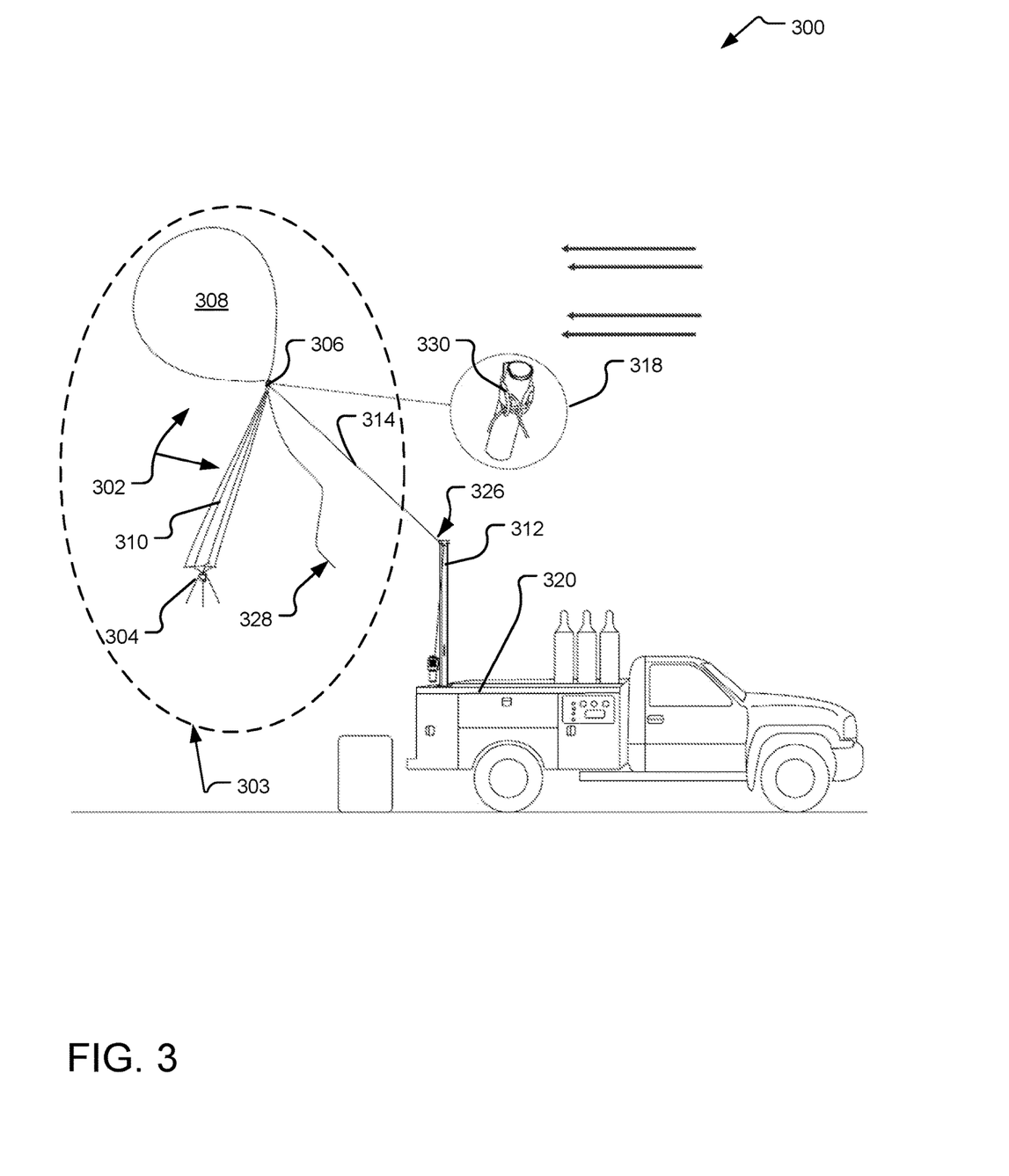
FIG. 3 illustrates another launch system configured for additional operations of a launch sequence.

FIG. 3 illustrates another launch system 300 configured for additional example operations of a launch sequence. The launch system 300 has many of the same components as FIG. 2 that serve the same functions as those described above.

Prior to launch, a high-altitude balloon system 303 is configured with a launch collar 306 wrapped around a central portion of a balloon envelope 302, forming a choke point that separates an upper portion 308 of the balloon envelope 302 from a lower portion 310 of the balloon envelope 302. During launch, a tether 314 structurally secures the launch collar 306 (and thereby, the high-altitude balloon system 303) to a mast 312 on a launch platform 320. Initially, the tether 314 is secured with a short leash such that the launch collar 306 is in close proximity to the launch platform 320. For example, the launch collar 306 may be touching or a few inches away from the mast 312, as illustrated FIG. 1. The tether has two opposite ends secured to or near the launch platform 320 and a central portion threaded through rings on the ring-lock mechanism 330 of the launch collar 306. During a launch sequence, a first end of the tether 314 (a "release end 328") is gradually paid out from a spool or other structure and finally released entirely from its associated ground-based attachment point.

In one implementation, the mast 312 has a height such that a distance between the top of the mast 312 and the ground exceeds a distance between the launch collar 306 and a payload 204 attached to the lower portion of the balloon envelope 302. This configuration ensures that the payload 304 cannot collide with the ground while the release end 328 is being paid out, as shown in FIGS. 2 and 3.

The ring-lock mechanism 330 remains in a locked state as long as the tether 314 remains threaded through the rings (e.g., as shown in magnified view 318). Features of FIG. 3 not specifically described above may be assumed to be the same or similar to like-named components discussed elsewhere herein.

Figure 4:
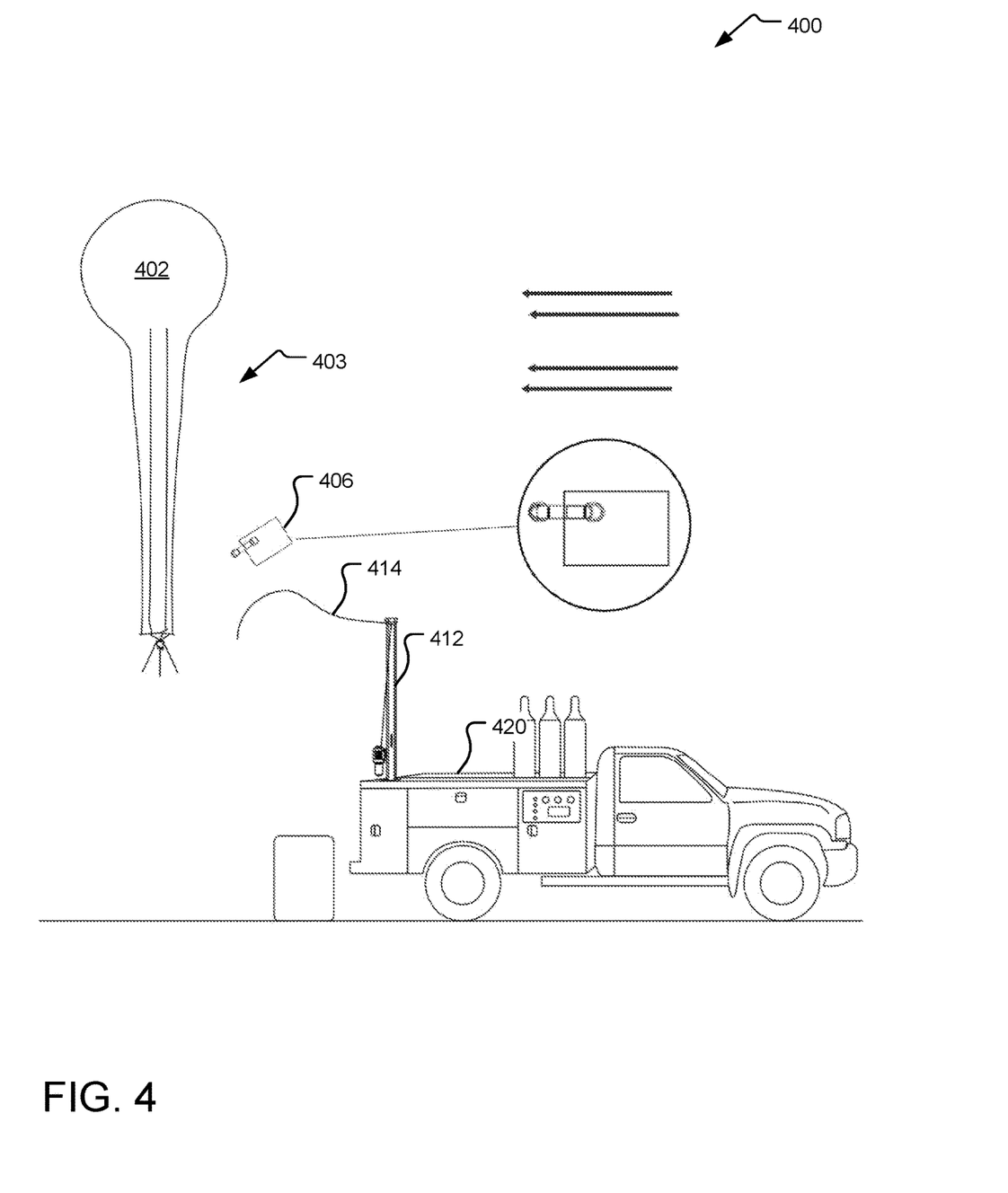
FIG. 4 illustrates another launch system configured for further example operations of a launch sequence.

FIG. 4 illustrates another launch system 400 configured for further example operations of a launch sequence for a high-altitude balloon 403. Features of the launch system 400 are the same or similar to those described above with respect to any of FIG. 1-FIG. 3. Prior to launch, a launch collar 406 is secured around a balloon envelope 402, creating a choke point between upper and lower portions of the balloon envelope 402. The launch collar 406 is secured to a mast 412 via a tether 414. When a first end of the tether is released, as shown in FIG. 3 (e.g., with an opposite end still anchored to a launch platform 420 or other ground-based attachment point), the lift force on the balloon envelope 402 causes the tether 414 to slide relative to a ring-lock mechanism (not shown) on the launch collar 406 such that the launch collar 406 up toward released end of the tether 414. Eventually, the tether 414 unthreads itself from the launch collar 406, immediately releasing tension in the ring-lock mechanism, which allows the launch collar 406 to fall open and separate from the balloon envelope 402 as shown in FIG. 4. The launch collar 406 falls down to the ground and the balloon ascends, gradually inflating with altitude due to expansion of the lift gas.

At this point, the high-altitude balloon system 403 is free to rise into the atmosphere. There is no risk of the launch collar 406 failing to separate from the balloon because the separation of the launch collar 406 from the balloon envelope 404 is the mechanism that releases the high-altitude balloon system 403.

Figure 5A:
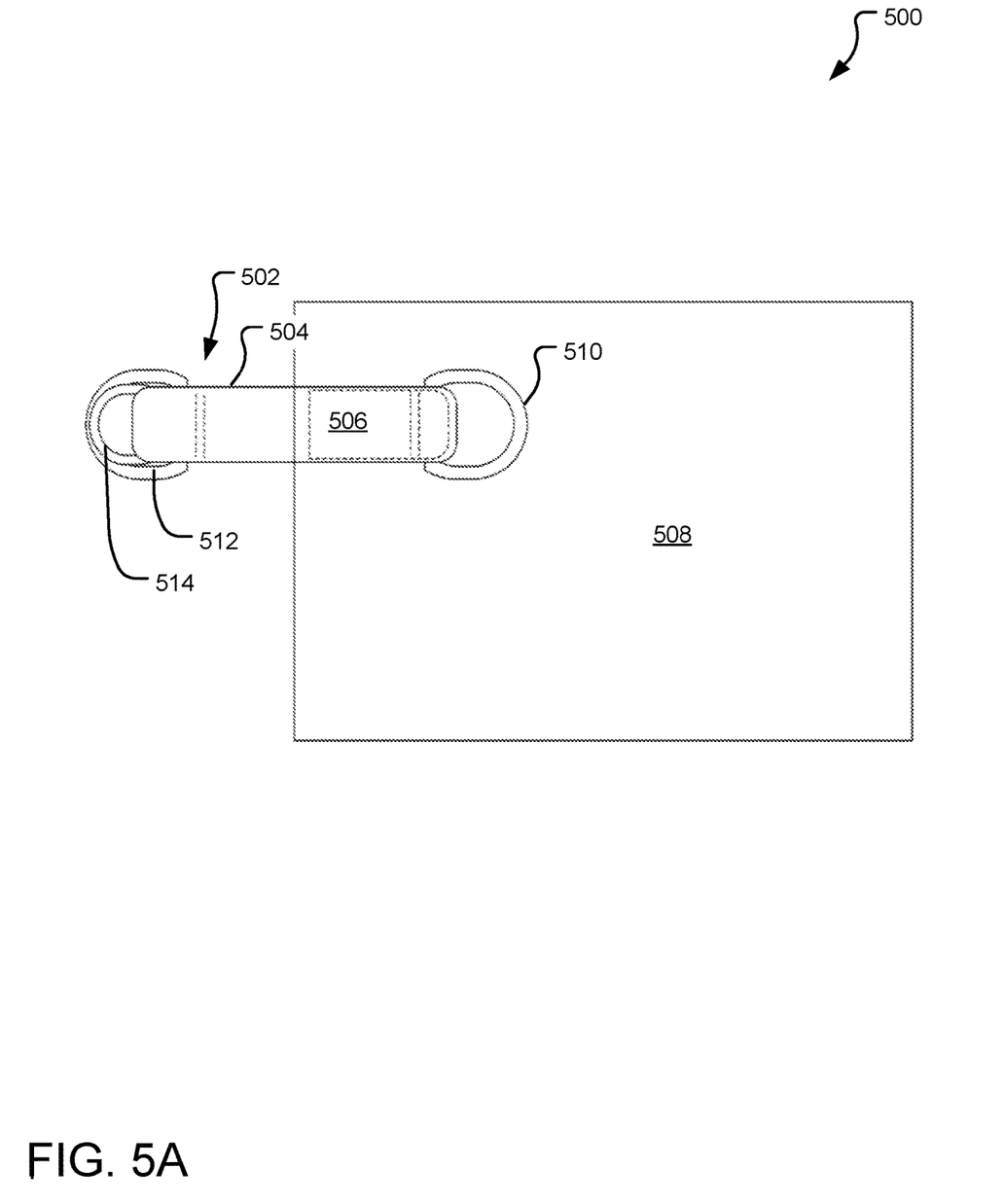
FIG. 5A illustrates a front-side view of example launch collar suitable for assisting in launch of a high-altitude balloon in any of the launch systems shown in FIG. 1-4.

FIG. 5A illustrates a front-side view of example launch collar 500 suitable for assisting in launch of a high-altitude balloon in any of the launch systems shown in FIG. 1-4. The illustrated side of the collar is, in one implementation, the side that faces outward (away from the balloon envelope) when in use. The launch collar 500 includes a main portion 508 and a releasable ring-lock mechanism 502. Although other locking mechanisms may be suitable, the releasable ring-lock mechanism 502 include includes a strap 504 with a middle portion 506 attached to (e.g., stitched) to the main portion 508 of the launch collar 500. A first end of the strap 504 is coupled to first ring 510, while a second end of the strap is coupled to second and third rings 512 and 514, as shown.

Figure 5B:
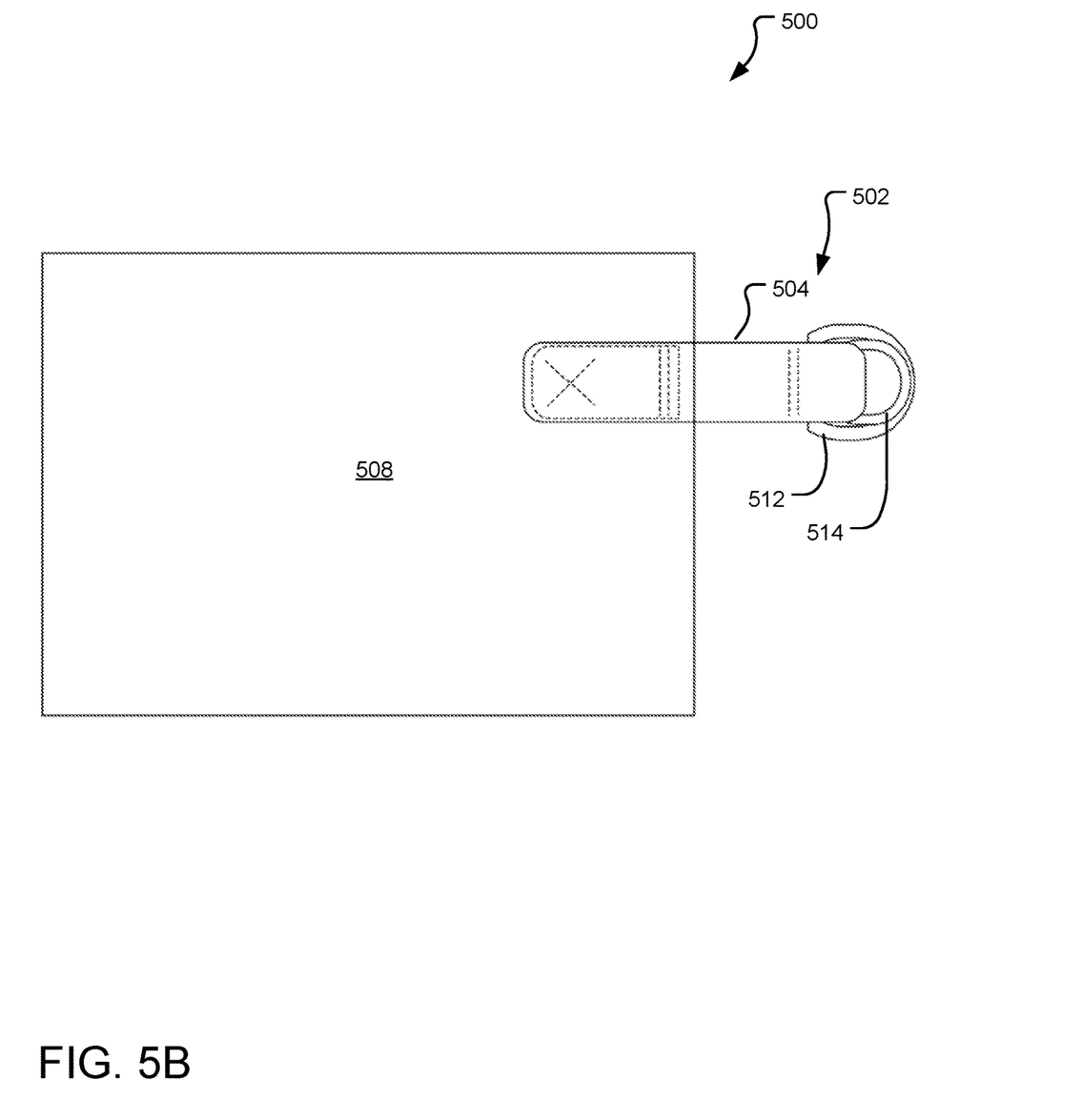
FIG. 5B illustrates a back-side view of the example launch collar of FIG. 5A.

FIG. 5B illustrates a back-side view of the example launch collar 500 of FIG. 5A. The side shown in FIG. 5B is the side of the launch collar 500 that faces toward the balloon envelope when in use. From this view, the second and third rings 512 and 514 are visible on the strap 504, but the first ring 510 is not.

Figure 5C:
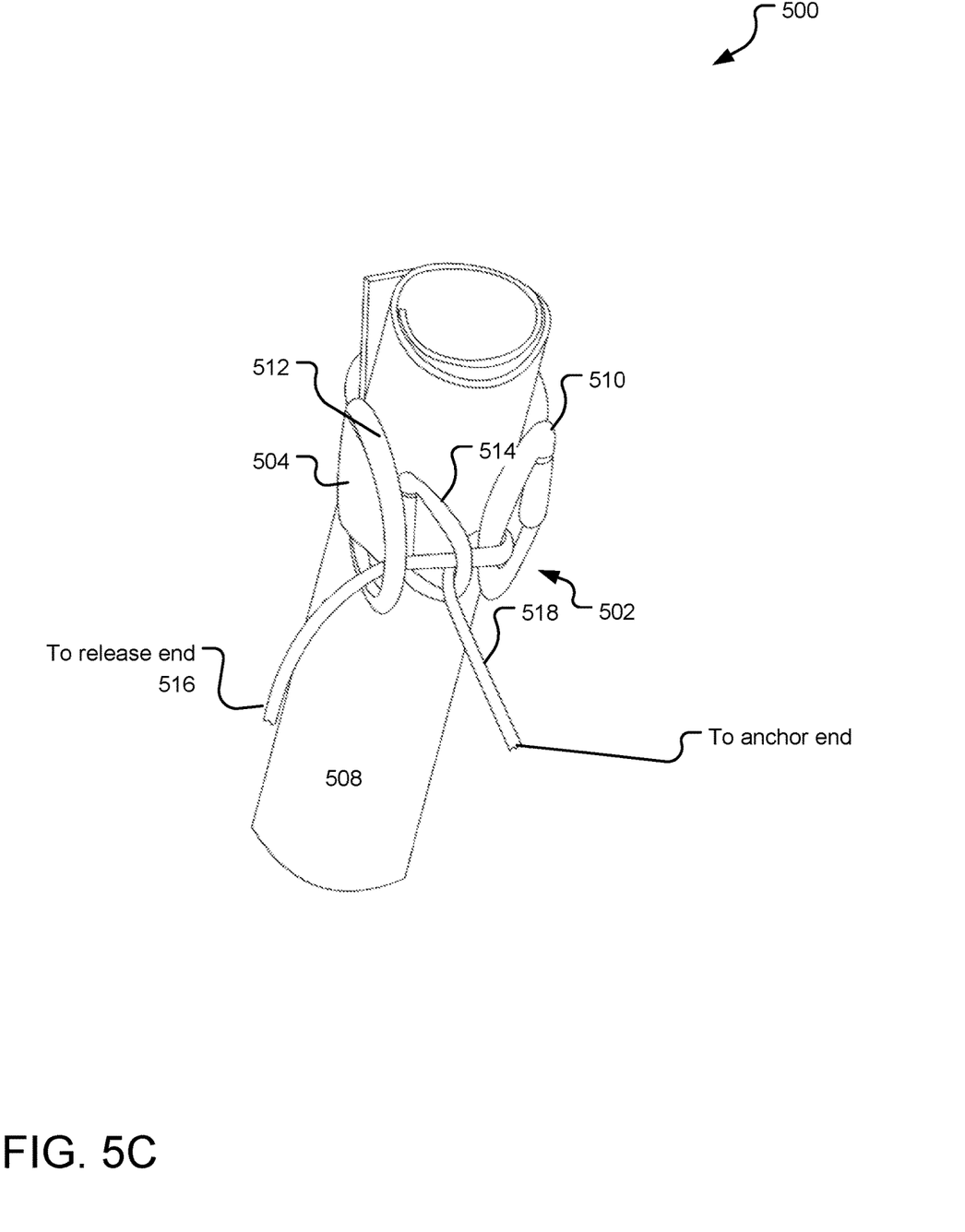
FIG. 5C illustrates the example launch collar of FIGS. 5A and 5B with a releasable ring-lock mechanism shown in a locked state.

FIG. 5C illustrates the example launch collar 500 of FIGS. 5A and 5B with the releasable ring-lock mechanism 502 shown in a locked state. In this view, it can be seen that the ring 512 is bigger than the ring 510 and that the ring 510 is bigger than the ring 514. For this reason, the following description refers to ring 512 as the "large ring 512", the ring 510 as the "medium ring 510", and the ring 514 as the "small ring 514."

To place the launch collar 500 in the locked state shown in FIG. 5C, the main portion 508 is rolled such that the front side (view shown in FIG. 5A) faces outward. Ends of the strap 504 are pulled around the rolled main portion 508 and toward one another, as shown. A tether 518 is threaded through the rings. In the illustrated implementation, the tether 518 is looped around the medium ring 510 by pulling a first end 516 (e.g., a release end) of the tether 518 under, up, and through the medium ring 510, as shown. Then, the first end 516 is then sequentially threaded through the small ring 514 and the large ring 512.

In one implementation where the launch collar 500 is implemented in the system shown in FIG. 3, the above-described threading of the first end 516 of the tether 518 is performed while a second opposite end ("the anchor end") remains secured to a ground-based attachment point. After being threaded through the rings of the releasable ring-lock mechanism 502, the first end 516 is also secured to a ground-based attachment point (e.g., tied to a fixed point or held in an operator's hands). As long as both ends of the tether 518 are secured to ground-based attachment points, the releasable ring-lock mechanism 502 remains under tension and the rings cannot open.

During a controlled launch sequence, the first end 516 of the tether may be gradually paid out, easing tension in the line to allow the launch collar 500 to slide along the tether 518 in the direction of the first end 516. When the first end 516 is completely set free, the tether 518 first decouples from the large ring 512, then the small ring 514 and finally, the medium ring 510. This releases remaining tension in the releasable ring-lock mechanism 502, allowing the main portion 508 of the launch collar 500 to unroll and fall away from the balloon envelope.

According to one implementation, the relative sizes of the rings are such that the small ring 514 can fit through the large ring 512 but not through the medium ring 510. This is sufficient to enable locking action while also ensuring that sudden quick tension in the tether 518 does in inadvertently suck the small ring 514 through the medium ring 510, which could jam the release mechanism. Additionally, use of three rings in the releasable ring-lock mechanism 502 rather than two is beneficial because it reduces rubbing on the balloon envelope in the transition period when the launch collar 500 is first beginning to open, thereby reducing a risk of damage to the balloon envelope at this moment in time.

Figure 6:
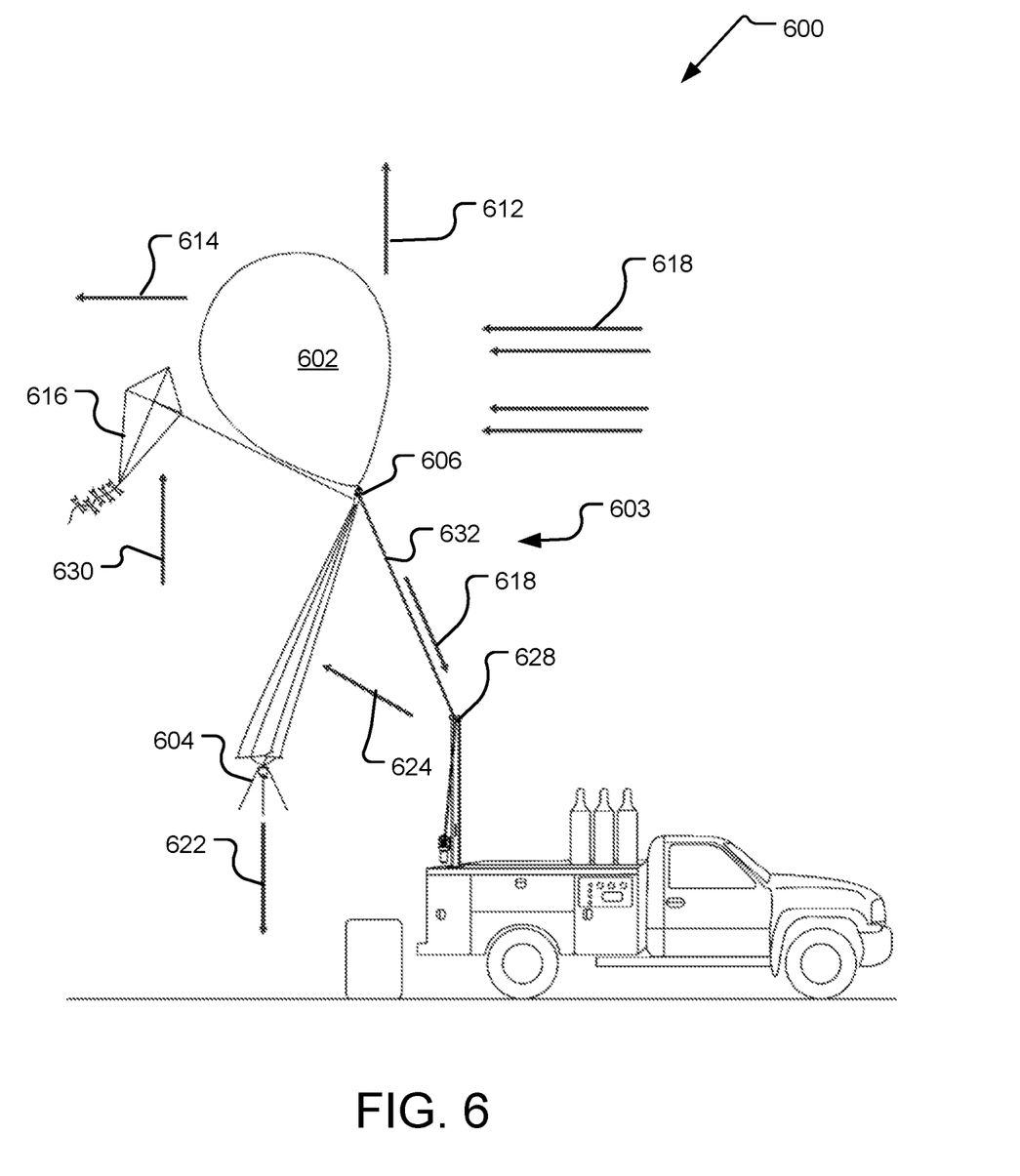
FIG. 6 illustrates a launch system similar to that shown in FIG. 1-4, but that further includes a self-orienting aerodynamic device that helps to stabilize a balloon envelope to protect a payload during launch.

FIG. 6 illustrates a launch system 600 similar to that shown in FIG. 1-4, but that further includes a self-orienting aerodynamic device 616 that helps to stabilize a balloon envelope 602 to protect a payload 604 during launch. In FIG. 6, the self-orienting aerodynamic device 616 is shown to be a kite but may assume other forms in other implementations such as that of a wing-shaped parachute (parafoil), or any other aerodynamic device that creates lift when presented with a cross-wind.

To demonstrate the benefits of the disclosed launch process as well as the utility of the self-orienting aerodynamic device 616, FIG. 6 further illustrates various forces at play during launch of a high-altitude balloon system 603. The high-altitude balloon system 603 includes a balloon envelope 602 anchored via a launch collar 606, as generally shown and described with respect to FIG. 1-4.

A buoyancy force 612 and drag force 614 caused by wind 618 create a tension force that may have a downward component (towards the earth) due to a tether 632 anchoring the balloon system to the ground (e.g., to a point below the wind 618). The wind 618 causes the balloon to lean over, and a downward force 622 is caused by the weight of a payload 604 and material of the balloon envelope 602. If the sum of the downward forces described exceed the buoyancy force 612 pulling up on a balloon envelope 602, the balloon may not rise into the sky if let out. However, anchoring the balloon envelope 602 by the launch collar 606 instead of a lower point on the balloon allows a lower portion (balloon stalk) of the balloon envelope 602 to be potentially pushed up, as shown by upward aerodynamic lift force 624 that counteracts the downward forces, assisting in lift.

Additionally, this configuration where the lower portion (balloon stalk) blows upward in the wind can help to prevent pendulum swing that occurs in systems that anchor the balloon envelope 602 is anchored at a lower point, such as at the payload 604. In the illustrated configuration, the upper portion of the balloon envelope 602 is pushed into a lean by the drag force 614 while the lower portion of the balloon envelope 602 is pushed over by the drag force 614 and up by the aerodynamic lift force 624. When released, the payload 604 may swing toward an anchor point 628 while the upper portion of the balloon envelope 602 continues to move up and away from the anchor point 628, perhaps leaning somewhat in the direction of the drag force 614. Since these forces counter-act one another, there is very little pendulum swing. Any pendulum swing that does occur is counteracted by the opposing motion in upper and lower portions of the balloon envelope, ensuring that the payload 604 does not get close the ground when the balloon is released.

For high wind situations, the self-orienting aerodynamic device 616 (e.g., a delta wing kite or parafoil) may be optionally utilized to create an additional upward force 630 helping to counteract system lean and get a balloon system higher into the sky for release. In FIG. 6, the self-orienting aerodynamic device 616 is shown attached to the launch collar 606. When the launch collar 606 is released from the balloon (as described elsewhere herein), the self-orienting aerodynamic device 616 remains attached to the launch collar 606 and thus would not continue to fly with the balloon system.

Figure 7:
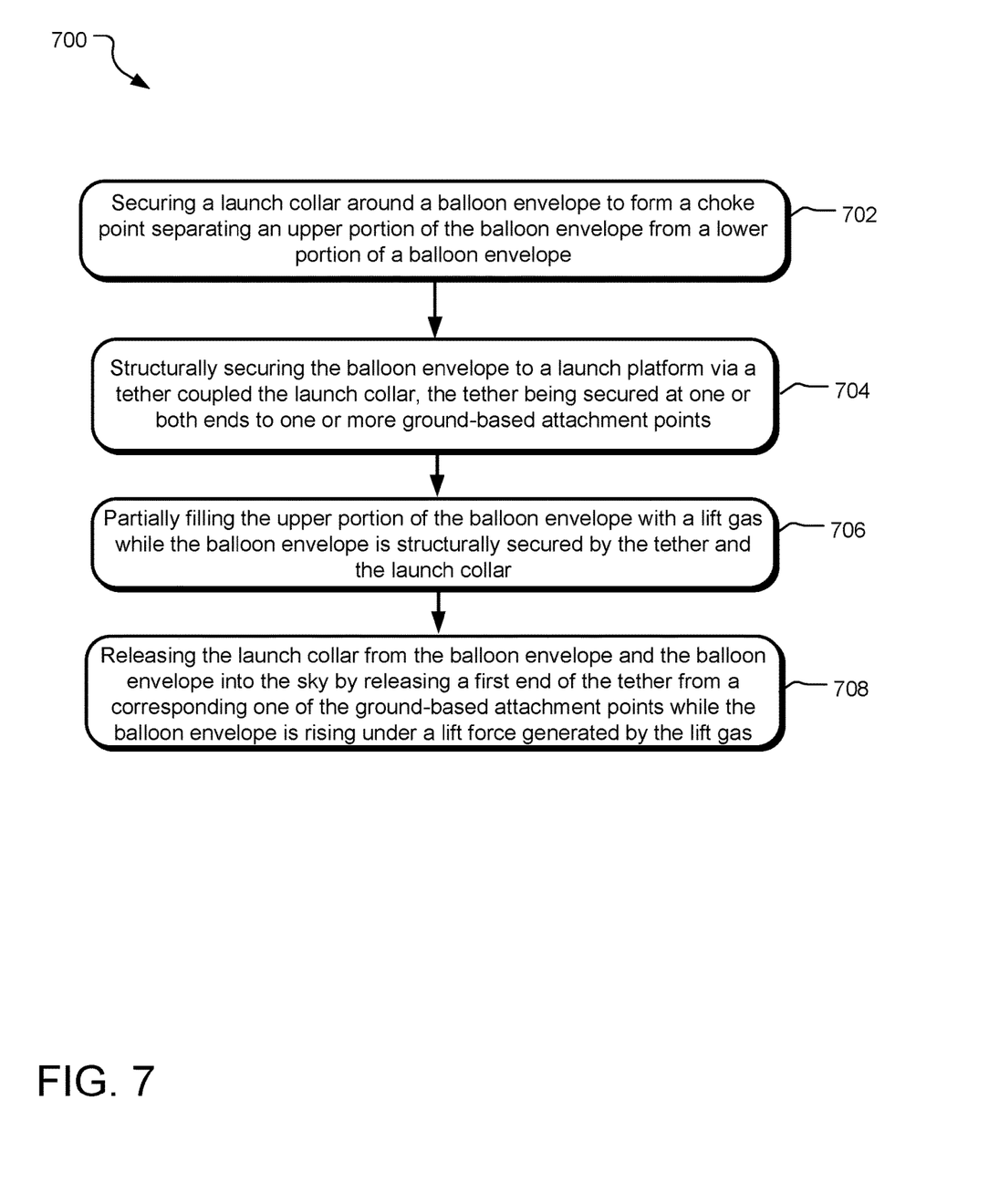
FIG. 7 illustrates example operations for launching a balloon system in high winds.

FIG. 7 illustrates example operations 700 for launching a balloon system in high winds. A securing operation 702 secures a launch collar around a balloon envelope to form a choke point that separates an upper portion of the balloon envelope from a lower portion of the balloon envelope. Another securing operation 704 structurally secures the balloon envelope to a mobile launch platform (e.g., an automobile) with a tether that extends between the launch collar and one or more ground-based attachment points either on or next to the mobile launch platform. According to one implementation, opposite ends of the tether are secured to the ground while a middle portion of the tether is coupled to a locking mechanism on the launch collar.

In one implementation, one or both ends of the tether are secured to a top end of a mast on the launch platform. A distance between the mast and the ground exceeds a distance between the launch collar and a payload of the balloon system. This configuration ensures the payload does not strike the ground at the moment when the balloon system is released from the tether. A filling operation 706 puts a lift gas into the upper portion of the balloon envelope with a lift gas while the balloon envelope is structurally secured to the launch platform by the tether and the launch collar.

While the balloon envelope is rising under a lift force generated by the lift gas, a releasing operation 708 releases the launch collar from the balloon envelope thereby releasing the balloon system into the sky. According to one implementation, the launch collar is released from the balloon envelope when a first end of the tether is set free of a corresponding one of the ground-based attachment points while an opposite second end of the tether remains under tension and attached to another one of the ground-based attachment points.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method of launching a high altitude balloon comprising:
   securing a launch collar around a balloon envelope to form a choke point separating an upper portion of the balloon envelope from a lower portion of the balloon envelope;
   structurally securing the balloon envelope to a launch platform or other ground-based structure via a tether coupled to one or more attachment points on the launch collar, the tether also being secured at one or both ends to one or more ground-based attachment points; and
   adding tension to the tether by injecting lift gas into the upper portion of the balloon envelope while the balloon envelope is structurally secured by the tether coupled to the launch collar; and
   releasing the balloon envelope from the launch platform by controllably releasing the launch collar from the choke point.

2. The method of claim 1, wherein the tether is secured at a first end to a first ground-based attachment point and the tether is secured at a second end to a second ground-based attachment point and releasing the balloon envelope from the launch platform further comprises:

controllably releasing a first end of the tether from the first ground-based attachment point while the second end of the tether remains attached to a second one of the ground-based attachment points.

3. The method of claim 2, wherein the balloon envelope rises under a lift force generated by the lift gas, the lift force generating an upward tension that disengages the tether from the launch collar by pulling the released first end of the tether back through one or more apertures on the launch collar.

4. The method of claim 1, wherein the launch collar includes a ring-lock mechanism including a central portion that wraps around the choke point and a strap that secures the central portion in place when wrapped around the choke point, the strap including at least one ring at each end, the tether being threaded through the at least one ring at each end of the strap when the launch collar is in a locked state.

5. The method of claim 4, wherein the strap on the ring-lock mechanism includes a small ring, a medium ring, and a large ring, and wherein the small ring rests between the medium ring and the large ring when the ring-lock mechanism is in a locked state.

6. The method of claim 4, wherein the small ring can fit though the large ring but not through the medium ring.

7. The method of claim 6, wherein the ring-lock mechanism is configured to:

apply tension to place the launch collar in a locked state around the choke point when the tether is under tension between the launch collar and the ground-based attachment points; and release the tension when the tether is decoupled from the at least one ring at each end of the strap, the release of the tension causing the launch collar to fall away from the balloon envelope.

8. The method of claim 1, further comprising:

attaching the launch collar to a top of a mast on the launch platform before filling the balloon envelope with the lift gas, wherein a distance between the top of the mast and underlying ground exceeds a distance between the launch collar and a payload attached to the lower portion of the balloon envelope.

9. The method of claim 1, further comprising:

anchoring a self-orienting aerodynamic device to the launch collar, the self-orienting aerodynamic device configured to generate a lift force when a cross-wind is present.

10. A launch system comprising:

a balloon system including a balloon envelope and a payload;

a launch collar with a locking mechanism, the launch collar being configured to wrap around the balloon envelope to form a choke point separating an upper portion of the balloon envelope from a lower portion of the balloon envelope, the upper portion of the balloon envelope containing a lift gas;

a tether coupled to the launch collar, the tether and the launch collar functioning to structurally secure the balloon envelope to a launch platform while the balloon envelope is filled with lift gas that applies upward tension to the tether, wherein release of the launch collar from the choke point releases the balloon envelope from the launch platform.

11. The system of claim 10, wherein the tether is configured to self-decouple from the launch collar in response to release of a first end of the tether from a first ground-based attachment point while a second end of the tether remains attached to a second ground-based attachment point.

12. The launch system of claim 10, wherein the locking mechanism includes two or more apertures coupled with the tether, the launch collar being configured to open and fall away from the choke point on the balloon envelope when the tether decouples from the two or more apertures.

13. The launch system of claim 12, wherein the strap includes a first end including a large ring and a small ring and a second opposite end including a medium ring, wherein the small ring rests between the medium ring and the large ring when the locking mechanism is in a locked state.

14. The launch system of claim 13, wherein the small ring can fit though the large ring but not through the medium ring.

15. The launch system of claim 10, wherein the locking mechanism is a ring-lock mechanism that includes a strap that wraps around the launch collar, the strap including at least one ring at either end, the tether being threaded through the at least one ring at each end of the strap when the locking mechanism is in a locked state.

16. The launch system of claim 10, wherein the locking mechanism is configured to:

apply tension locking the launch collar around the choke point when the tether is tensioned between the launch collar and the platform; and release the tension when the tether is decoupled from the launch collar, the release of the tension causing the launch collar to fall away from the balloon envelope.

17. The launch system of claim 10, further comprising:

a mast on the launch platform, the launch collar being anchored via the tether to a top end of the mast, wherein a distance between a top of the mast and underlying ground exceeds a distance between the launch collar and the payload attached to the lower portion of the balloon envelope.

18. The launch system of claim 10, further comprising:

a self-orienting aerodynamic device anchored to the launch collar, the self-orienting aerodynamic device configured to generate a lift force when a cross-wind is present.

19. The launch system of claim 10, wherein the launch platform is an automobile.

20. The launch system of claim 10, further comprising:

a fill port in the balloon envelope, the fill port being is located in the upper portion of the balloon envelope at a location above the launch collar.

* * * * *